(12) United States Patent
Hiraishi et al.

(10) Patent No.: US 10,307,948 B2
(45) Date of Patent: Jun. 4, 2019

(54) IN-MOLD DECORATION MOLDING METHOD AND IN-MOLD DECORATION MOLDING MACHINE

(71) Applicant: Panasonic Intellectual Property Management Co., Ltd., Osaka (JP)

(72) Inventors: Masakazu Hiraishi, Kyoto (JP); Takashi Nakagawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 279 days.

(21) Appl. No.: 14/997,537

(22) Filed: Jan. 17, 2016

(65) Prior Publication Data

US 2016/0297126 A1    Oct. 13, 2016

(30) Foreign Application Priority Data

Apr. 10, 2015 (JP) ................... 2015-080477

(51) Int. Cl.
*B29C 45/14* (2006.01)
*B29C 45/78* (2006.01)
*B29L 31/00* (2006.01)

(52) U.S. Cl.
CPC .. *B29C 45/14688* (2013.01); *B29C 45/14836* (2013.01); *B29C 45/78* (2013.01); *B29C 2045/14877* (2013.01); *B29C 2945/7604* (2013.01); *B29C 2945/76254* (2013.01); *B29C 2945/76347* (2013.01); *B29C 2945/76545* (2013.01); *B29C 2945/76802* (2013.01); *B29C 2945/76826* (2013.01); *B29L 2031/722* (2013.01)

(58) Field of Classification Search
CPC ............... B29C 45/14688; B29C 45/14836
See application file for complete search history.

(56) References Cited

U.S. PATENT DOCUMENTS

| | | | | |
|---|---|---|---|---|
| 4,360,329 A | * | 11/1982 | Hatakeyama | ....... B29C 45/1418 |
| | | | | 264/132 |
| 4,418,033 A | | 11/1983 | Hatakeyama | |
| 5,985,187 A | | 11/1999 | Weder et al. | |

(Continued)

FOREIGN PATENT DOCUMENTS

| | | |
|---|---|---|
| JP | 2001-293781 | 10/2001 |
| JP | 2004-216679 | 8/2004 |
| JP | 2008-094038 | 4/2008 |

*Primary Examiner* — Robert C Dye
*Assistant Examiner* — Nicholas R Krasnow
(74) *Attorney, Agent, or Firm* — Panasonic IP Management; Kerry S. Culpepper (57) ABSTRACT

A warm-air blowing circuit and another warm-air blowing circuit are disposed so as to heat a film from both sides of a projection side and a recess side of a die, warm air reaches and heats the film from the time of supplying of the film, warm air continues to enter a space in which a resin is to be ejected even after the die is closed, and thereby the film is likely to extend. Therefore, the film is unlikely to be torn at the time of molding when the film is likely to be shaped after a shape of the die and it is possible to prevent broken pieces of the film or broken pieces of a decoration film from being mixed and being stuck to the surface of the die such that it is possible to improve quality of the external appearance of a molded product.

5 Claims, 11 Drawing Sheets (56) References Cited

U.S. PATENT DOCUMENTS

| | | | |
|---|---|---|---|
| 6,257,866 B1* | 7/2001 | Fritz | B29C 51/06 425/387.1 |
| 6,748,721 B2 | 6/2004 | Kodai | |
| 2011/0266721 A1* | 11/2011 | Song | B29C 45/14262 264/511 |
| 2014/0190924 A1 | 7/2014 | Aoki et al. | |
| 2016/0082629 A1* | 3/2016 | Modi | B29C 45/1657 264/28 |

* cited by examiner

IN-MOLD DECORATION MOLDING METHOD AND IN-MOLD DECORATION MOLDING MACHINE

BACKGROUND OF THE INVENTION

1. Field of the Invention

The present invention relates to an in-mold decoration molding method and an in-mold decoration molding machine in which a pattern is printed on a film and the pattern on the film is transferred during injection molding.

2. Description of the Related Art

Figure 11:
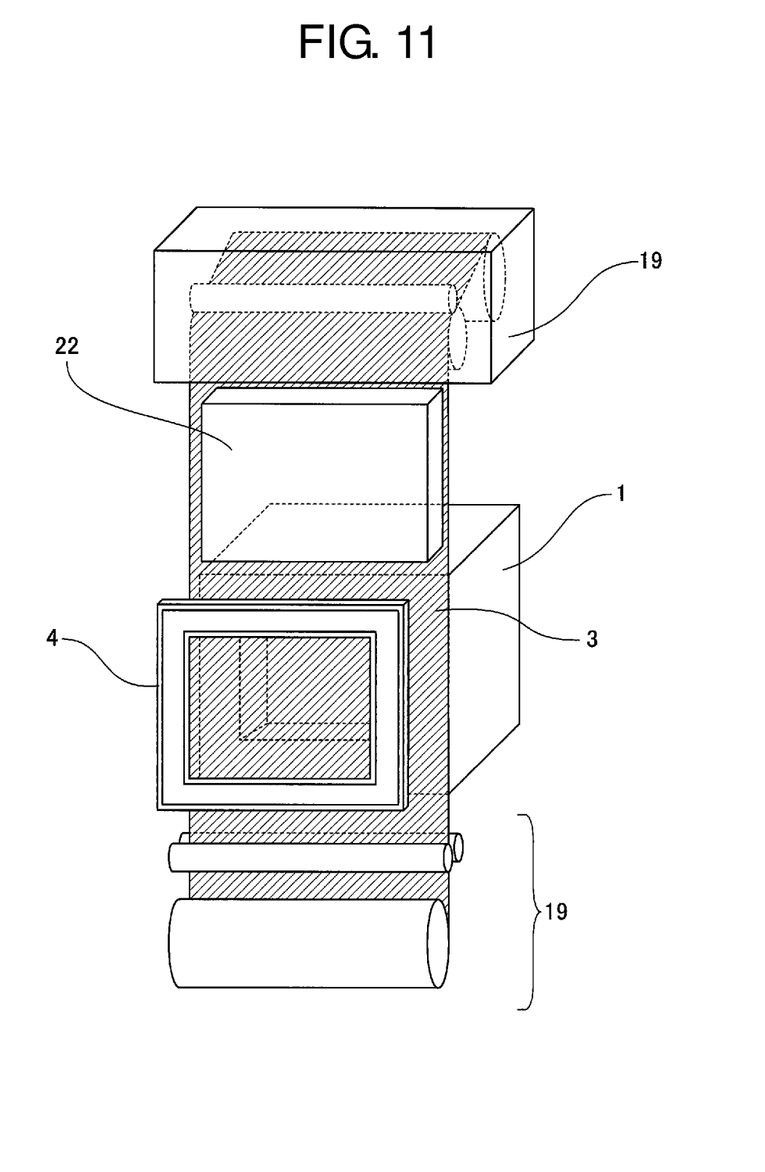
FIG. 11 is a diagram depicting a decoration molding method in the related art, which is disclosed in Japanese Patent Unexamined Publication No. 2008-94038.

As a decoration molding method in the related art, there has been a method in which a pattern is printed on a film and the pattern is transferred at the same time of molding, during injection molding (for example, see Japanese Patent Unexamined Publication No. 2008-94038). FIG. 11 is a view depicting a decoration molding method in the related art, which is disclosed in Japanese Patent Unexamined Publication No. 2008-94038. A molding die for injection molding of a resin material is configured to include first die 1 and a second die (not illustrated), film 3 is interposed between first die 1 and the second die (not illustrated), and a resin is injected on film 3 sealed in the dies. In this manner, a decoration film or functional film printed or stacked on film 3 is transferred onto a molded body while an injection-molded body is molded with high accuracy. Film 3 is supplied in a roll shape.

In general, the decoration molding method is performed in the following procedure. First, a decoration film or a functional film is printed or transferred and stacked on film 3 having the roll shape, in advance, and film 3 is disposed between first die 1 and a second die (not illustrated) of the molding die. Next, film 3 is fixed to first die 1 using clamp jig 4. Then, the second die (not illustrated) is caused to move and comes into close contact with first die 1, and a predetermined amount of a molten resin is injected between first die 1 and the second die (not illustrated), and a predetermined molded body is molded. At this time, the decoration film on film 3 is transferred to a molded product. After a certain period of time of cooling, the molded product is taken out.

In the decoration molding method, particularly, film 3 needs to extend along a surface of a die part of first die 1, at this time, film 3 is fixed to the surface of the die part of first die 1 through adsorption, the adsorption is released when the molded product is taken out, and, in general, the molded product is taken out.

In general, in the decoration molding method, a film, to which a decoration film adheres, is caused to be shaped after a die shape by injecting a resin, and thus, in a case where a molded product has a deep drawing shape, the film in the molding die significantly extends, the film extends exceeding the elastic limit of the film itself and the decoration film, and thus, the film becomes partially thin. In this case, when the dies are closed, a thin portion of the film or the decoration film receives stress exceeding breaking limit stress and is torn in some cases. When the film is torn, a torn piece is generated in some cases. At this time, there are drawbacks in that the inside of the molding die is filled with torn pieces of the film, the torn piece is stuck to a die molding surface, and the molded product has an external defect such as a dent or damage.

In Japanese Patent Unexamined Publication No. 2008-94038, in order to solve the above drawbacks, film heating heater 22, which heats film 3 on the molding die, is disposed between first die 1 and film supply device 19 which includes a supply mechanism of the film and a winding mechanism of the film. Before film 3 is caused to be shaped after the molding die shape, film 3 extends by being heated to a temperature near the softening point. Therefore, it is easy to supply film 3 in the molding die and to cause film 3 to be shaped after the molding die shape.

CITATION LIST

Patent Literature

PTL 1; Japanese Patent Unexamined Publication No. 2008-94038

SUMMARY OF THE INVENTION

However, film 3 is supplied into the molding die and is fixed to the molding die using a clamp. When the dies are closed, the temperature of film 3 is likely to return to normal temperature, heating effects are decreased, and a tear of the film occurs in some cases.

The invention is provided to solve the circumstances in the related art, and an object thereof is to improve a quality of the external appearance of a molded product.

In order to achieve the above object, the invention is directed to an in-mold decoration molding machine that performs resin molding in a state in which a film having a surface, on which a decoration layer is provided, is disposed in a cavity of a molding die formed by a plurality of dies of at least a first die and a second die, and that transfers the decoration layer to a resin molded product, the in-mold decoration molding machine including; a first warm-air blowing circuit which is formed in the first die and through which warm air is blown into the cavity; a second warm-air blowing circuit which is formed in the second die and through which warm air is blown into the cavity; a first exhaust valve which is formed in the first die and through which warm air is discharged from the first warm-air blowing circuit; and a second exhaust valve which is formed in the second die and through which warm air is discharged from the second warm-air blowing circuit. When the molding die is fastened, warm air is blown to the cavity from the first warm-air blowing circuit and the second warm-air blowing circuit and the film is heated. After the molding die is completely fastened, warm air continues to be blown from the second warm-air blowing circuit while warm air is discharged by the first exhaust valve from the first warm-air blowing circuit and warm air is stopped being blown in the cavity. Then, after warm air is discharged by the second exhaust valve from the second warm-air blowing circuit and warm air is stopped being blown in the cavity, the resin is injected.

In addition, in the invention, there is provided an in-mold decoration molding method of performing resin molding in a state in which a film having a surface, on which a decoration layer is provided, is disposed in a cavity of a molding die formed by a plurality of dies of at least a first die and a second die, and of transferring the decoration layer to a resin molded product, the in-mold decoration molding method including: disposing the film between the first die and the second die; fastening the dies in a state in which warm air is blown to the film from the first die side and warm air is blown to the film from the second die side; stopping the blowing of warm air from the first die side in the state in which the dies are fastened; and injecting a resin in the cavity. The film is heated with warm air blown from the first die and the second die.

As above, the film is heated from supplying the film with decoration in the die to the injection of the resin after the closing of the die, and thereby the film is likely to extend. Therefore, the film is unlikely to be torn at the time of molding when the film is likely to be shaped after a shape of the die and it is possible to prevent broken pieces of the film or broken pieces of a decoration film from being mixed and being stuck to the surface of the die such that it is possible to improve quality of the external appearance of a molded product.

DETAILED DESCRIPTION OF THE PREFERRED EMBODIMENT

Exemplary embodiments of the invention will be described with respect to the drawings.

Figure 1:
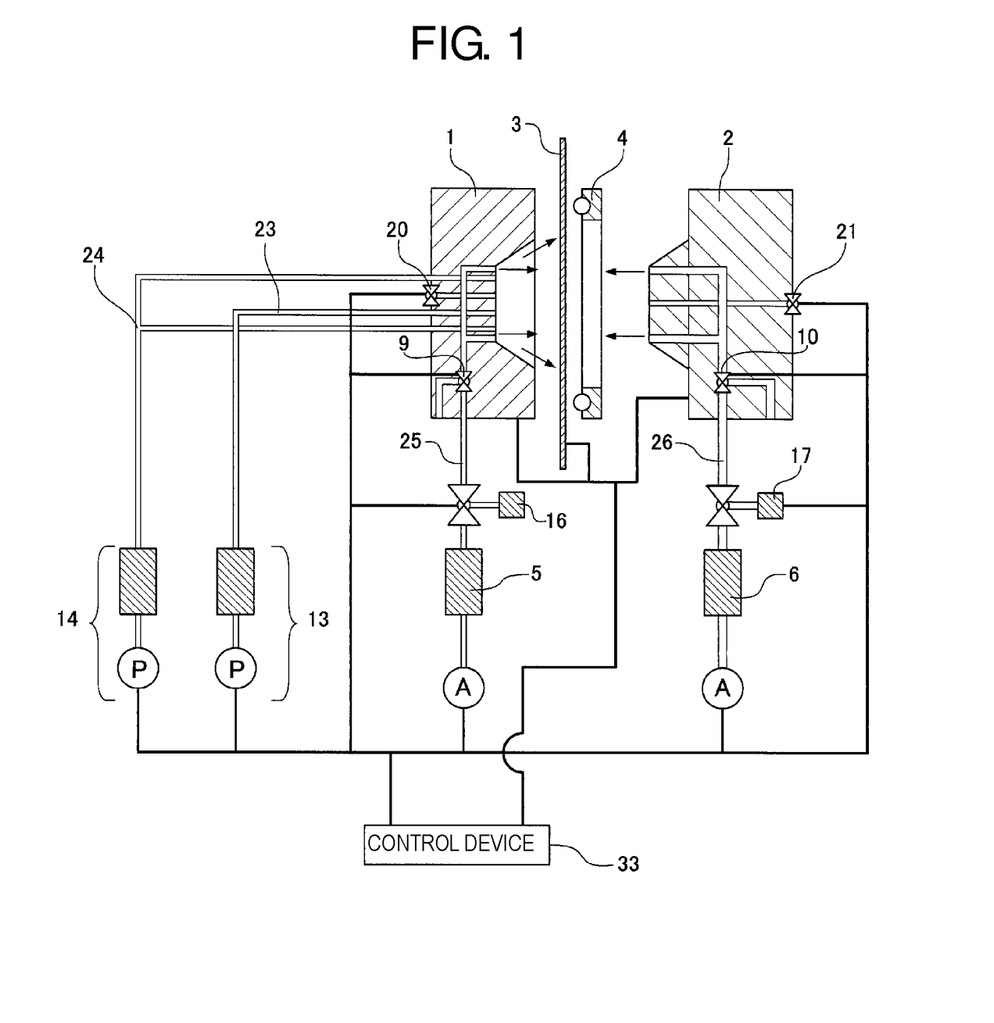
FIG. 1 is a schematic diagram illustrating a configuration of a decoration molding machine of the invention.

FIG. 1 is a schematic diagram illustrating a configuration of a decoration molding machine of the invention.

The decoration molding machine of the invention is configured to include first die 1, second die 2, and clamp jig 4 that fixes film 3. adsorption circuit (=channel or passage) 23 that adsorbs film 3, adsorption circuit (=channel or passage) 24, warm-air blowing circuit (=channel or passage) 25, warm-air heater 5 that generates warm air, and regulating valve 16 which regulates a flow rate of the warm air, are connected to first die 1. First die 1 includes exhaust valve 20 which releases the warm air when film 3 is fixed by clamp jig 4, and switching valve 9 that blocks the warm air from entering the dies when film 3 is adsorbed. Vacuum source 13 and vacuum source 14 are connected to adsorption circuit 23 and adsorption circuit 24, respectively. Adsorption circuit 23 and adsorption circuit 24 adsorbs film 3, and inserted film 3 is adsorbed to the inner surface of a cavity of first die 1. Warm-air heater 5 performs blowing of the warm air and film 3 is warmed up by the warm air through warm-air blowing circuit 25 from when film 3 is inserted to when film 3 is adsorbed. Warm-air blowing circuit (=channel or passage) 26, warm-air heater 6 that generates warm air, and regulating valve 17 which regulates a flow rate of the warm air, are connected to second die 2. Second die 2 includes exhaust valve 21 that releases the warm air, and switching valve 10 that blocks the warm air from entering the dies during resin injection. Warm-air heater 6 performs blowing of the warm air and film 3 is warmed up by the warm air through warm-air blowing circuit 26 from when film 3 is inserted to when resin injection is performed. Film 3 transported to be interposed between first die 1 and second die 2 by a film transport mechanism (not illustrated) is held by clamp jig 4 and is fixed to first die 1, in a state where adsorption circuit 23 connected to vacuum source 13 and adsorption circuit 24 connected to vacuum source 14 provided in first die 1 vacuum-adsorb film 3. Film 3 is fastened to first die 1 and second die 2 in a state where film 3 is fixed to first die 1 by adsorption circuit 23, adsorption circuit 24, and clamp jig 4. Then, a molten resin is injected into a cavity formed by first die 1 and second die 2, and predetermined molding is performed through cooling. At this time, a pattern printed on film 3 is transferred to a molded body at the same time. For example, film 3 has a two-layer structure, and a decoration layer with the pattern is formed on a base member. Then, only the decoration layer is transferred to the molded body, and thereby the pattern is formed on the surface of the molded body. Molding dies may be configured to include three or more dies with another die, in addition to first die 1 and second die 2. In addition, the configuration, in which film 3 is fixed by clamp jig 4, is described as an example; however, a configuration, in which clamp jig 4 is not provided in a case where film 3 is sufficiently fixed by the molding die, may be employed. In addition, a case where an adsorption mechanism having two systems of vacuum source 13 and adsorption circuit 23, and vacuum source 14 and adsorption circuit 24 is provided is described; however, the adsorption mechanism may have one system or three systems. As mentioned above, it is possible to provide the adsorption mechanism, thereby to adsorb film 3, and to perform the resin molding and it is possible to transfer the decoration layer with high accuracy. However, the adsorption mechanism is not needed depending on a shape of the molded product in some cases. In the following description, a configuration, in which vacuum source 13 and adsorption circuit 23, and vacuum source 14 and adsorption circuit 24 are provided as the adsorption mechanism, is described as an example. In addition, it is also possible to automatically perform, by control device 33, operations of vacuum source 13, vacuum source 14, warm-air heater 5, warm-air heater 6, regulating valve 16, regulating valve 17, switching valve 9, switching valve 10, exhaust valve 20, and exhaust valve 21. Control device 33 is, for example, a computer, and performs control on the basis of positions of first die 1, second die 2, and film 3, or a temperature inside the cavity or the warm air. Further, it is also possible to provide sensors which measure positions of first die 1, second die 2, and film 3, respectively, or a sensor which measures a temperature inside the cavity or the warm air.

Next, operations of the decoration molding machine of the invention during the molding and a decoration molding method will be described in detail.

FIG. 2 to FIG. 8 are sectional views illustrating an operational order of the decoration molding machine in the decoration molding method of the invention, and are views when viewed in a direction parallel to a flat surface of film 3 from an end surface of film 3, in Example of the operation during the molding in the present machine.

Figure 2:
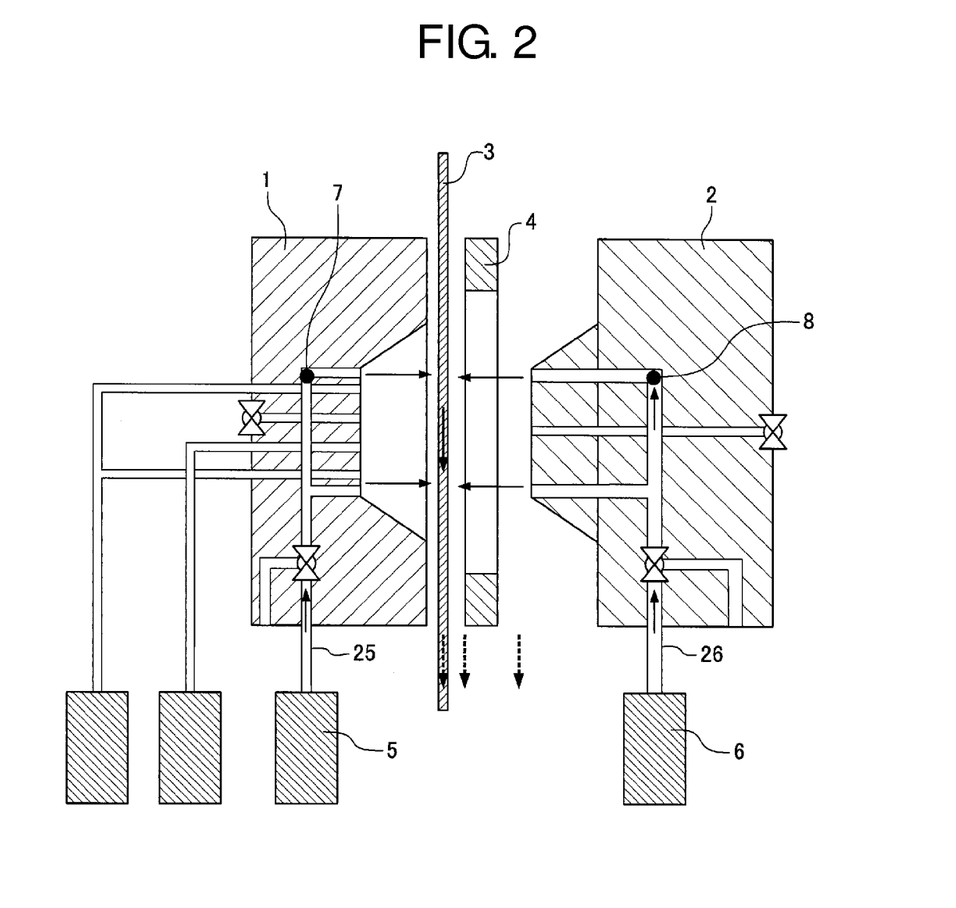
FIG. 2 is a sectional view illustrating an operational order of the decoration molding machine in the decoration molding method of the invention.

In FIG. 2, film 3 is supplied to first die 1, passes through first die 1 and clamp jig 4, and is supplied to first die 1 so as to move by a predetermined amount such that a predetermined pattern is fitted at a predetermined position.

At this time, film 3 receives a certain amount of tension by a film supply device and a film winding device (not illustrated). For example, a range of decoration of the molded product is positioned 1 mm or more in depth from a joined surface of first die 1 and second the 2.

In FIG. 2, when film 3 moves by the predetermined amount, from first die 1, the warm air generated by warm-air heater 5 reaches film 3 through warm-air blowing circuit 25. Meanwhile, from second die 2, the warm air generated by warm-air heater 6 reaches film 3 through warm-air blowing circuit 26. At this time, the temperature of the warm air is measured by temperature sensor 7 and temperature sensor 8 which are provided in the dies, respectively, and control device 33 (refer to FIG. 1) performs temperature control of warm-air heater 5 and warm-air heater 6 such that the heaters operate at a predetermined temperature. The warm air is blown to both surfaces of film 3 and film 3 is warmed until film 3 is fixed. The temperature is determined depending on a coating material printed on film 3 and a material stacked thereon; however, the temperature of the warm air is controlled such that the temperature of film 3 is from 80° C. to 100° C. at which an extension rate of these coating materials is high within an elastic range. In other words, film 3 is heated to a temperature near the softening point of film 3.

Figure 3:
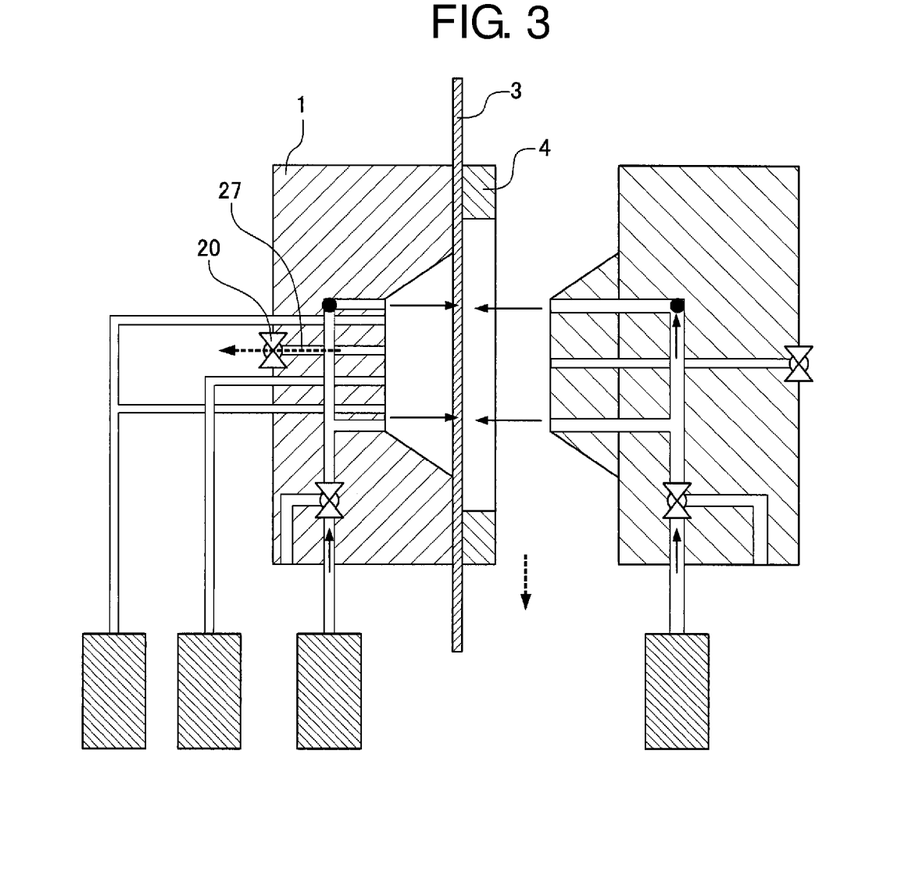
FIG. 3 is a sectional view illustrating the operational order of the decoration molding machine in the decoration molding method of the invention.

Next, in FIG. 3, after a tensile force applied to film 3 is removed, film 3 is continuously warmed, and clamp jig 4 presses film 3 against first the 1. At this time, after clamp jig 4 presses film 3 against first die 1, the tensile force of film 3 may be removed. In addition, since clamp jig 4 presses film 3 against first die 1, the warm air blown from first die 1 is not discharged. Therefore, first die 1 is provided with dedicated exhaust port 27, exhaust valve 20 for the first die is opened, and then the warm air is discharged. Thereby it is possible to circulate the warm air while film 3 is adsorbed. In addition, a method in which, since a molding die, in general, is assembled with multiple members, warm air escapes through a gap formed by the assembly, may also be employed.

Figure 4:
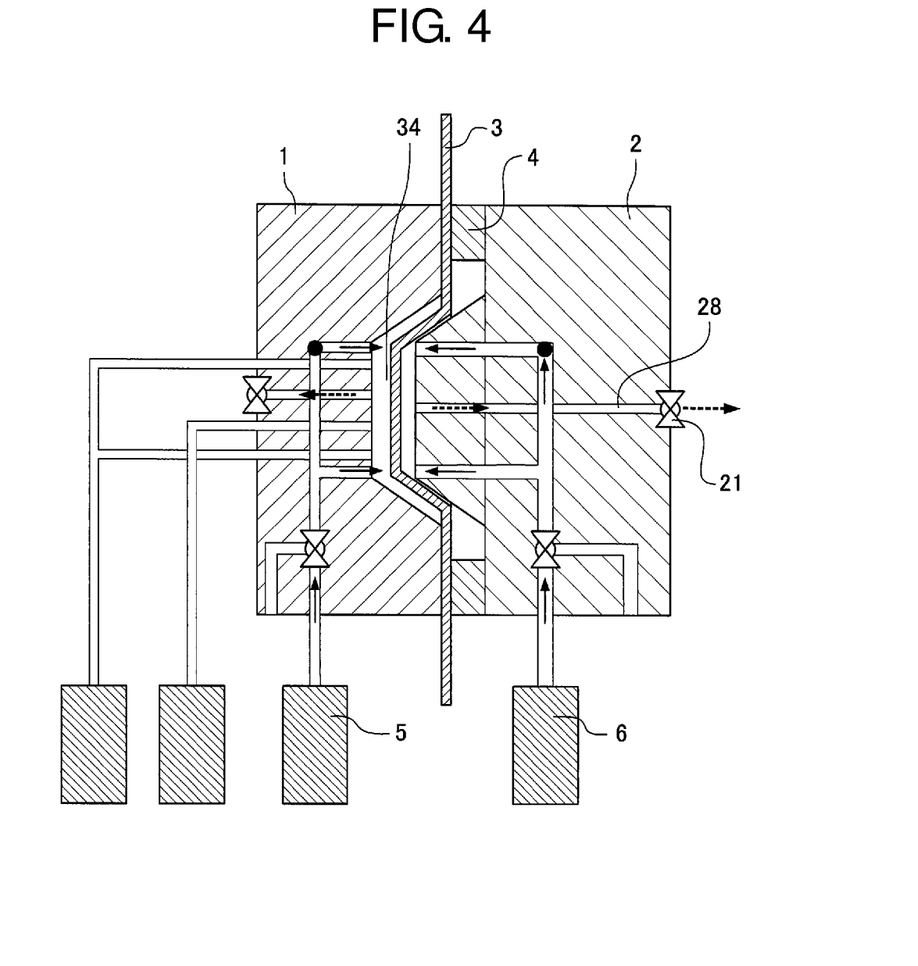
FIG. 4 is a sectional view illustrating the operational order of the decoration molding machine in the decoration molding method of the invention.

Next, in FIG. 4, first die 1 and second die 2 are closed. At this time, film 3 is pressed by clamp jig 4, and second die 2 enters a frame of clamp jig 4. In this manner, film 3 is extended partially and is confined in cavity 34 which is a molding space between first die 1 and second die 2. At this time, since film 3 is heated by the warm air blown from warm-air heater 5 and warm-air heater 6, it is possible to cause film 3 to extend by pressure (pressure of air) of warm air even when second die 2 is inserted. Therefore, it is possible to prevent film 3, which extends to be thin, from being torn by sliding over the surfaces of the molding die. In addition, at this time, since film 3 is pressed by first die 1, clamp jig 4, and second die 2, the warm air blown from second die 2 is not discharged. Therefore, second die 2 is provided with dedicated exhaust port 28, exhaust valve 21 is opened, and thereby it is possible to circulate the warm air while film 3 is adsorbed by discharging the warm air. In addition, since a molding die, in general, is assembled with multiple members such as an ejector pin for taking out the molded product, a method in which warm air escapes through a gap formed by the assembly, may also be employed. At this time, since the warm air flows out from first die 1 and second die 2, it is reduced that the film closely contacts the molding die by pressure of the warm air. Therefore, it is possible to suppress transmission of an amount of heat of heated film 3 to the molding die through the contact, and thus it is possible to suppress temperature reduction of film 3.

Figure 5:
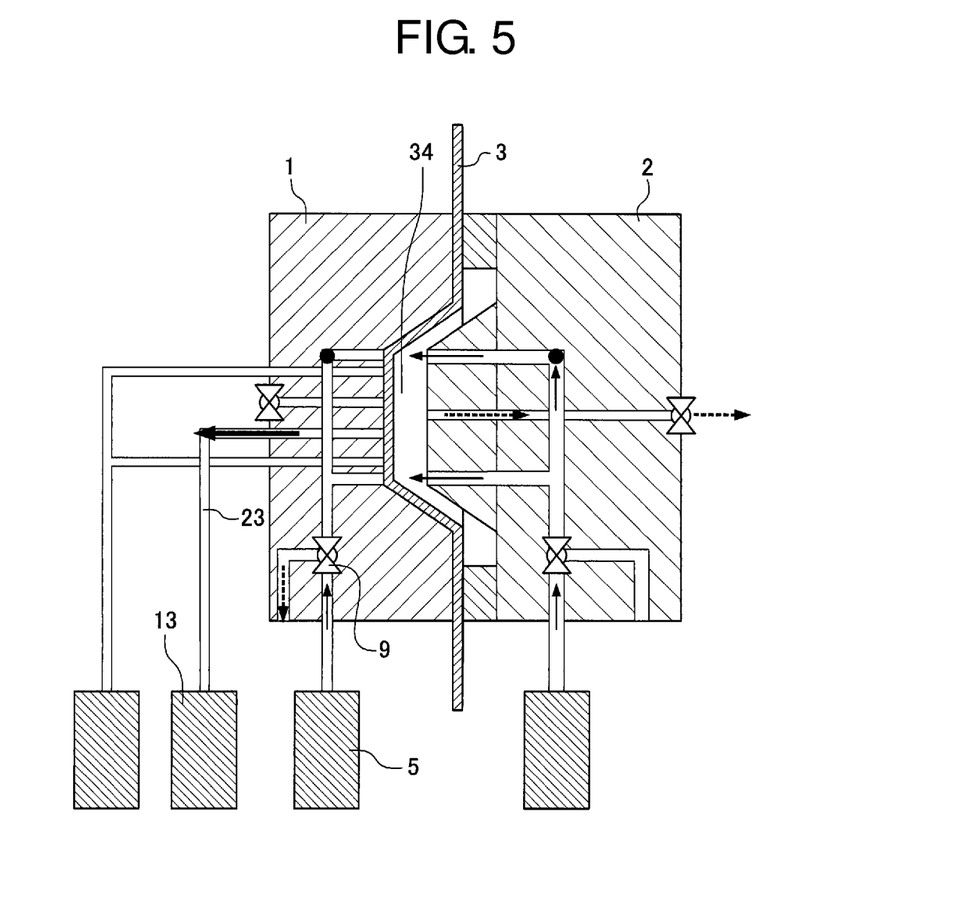
FIG. 5 is a sectional view illustrating the operational order of the decoration molding machine in the decoration molding method of the invention.

Next, in FIG. 5, film 3 is adsorbed and fixed to first die 1. At this time, when warm air flows out from first die 1, switching valve 9 performs switching. In this manner, the warm air does not flow out from a molding surface of first die 1 and the warm air is discharged from cavity 34 as is. Since warm-air heater 5 does not need to stop air supply, a rapid increase of temperature in the heater itself due to the stop of warm air does not happen, and it is possible to prolong a service life of warm-air heater 5. Next, vacuum source 13 is caused to operate, and adsorption of film 3 is started using adsorption circuit 23. At this time, since the warm air is blown from second die 2, film 3 is heated by the warm air and is also pressed against first die 1.

Figure 6:
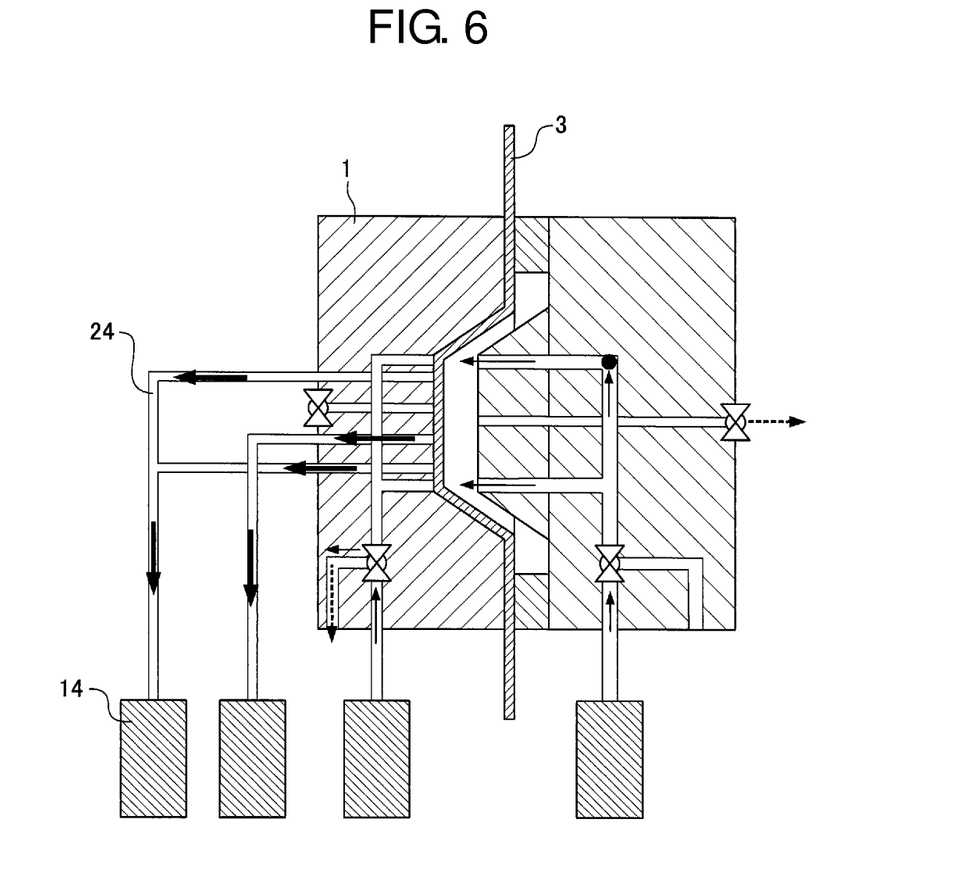
FIG. 6 is a sectional view illustrating the operational order of the decoration molding machine in the decoration molding method of the invention.

Next, in FIG. 6, vacuum source 14 is caused to operate, and adsorption of film 3 is started using adsorption circuit 24. It is possible for film 3 to hereby be adsorbed to the entire surface of first die 1. In this manner, vacuum source 13 and vacuum source 14 are caused to start operating with a temporal difference from each other, and thereby it is possible to adsorb film 3 in order, in film adsorbing surfaces of the molding die.

Figure 7:
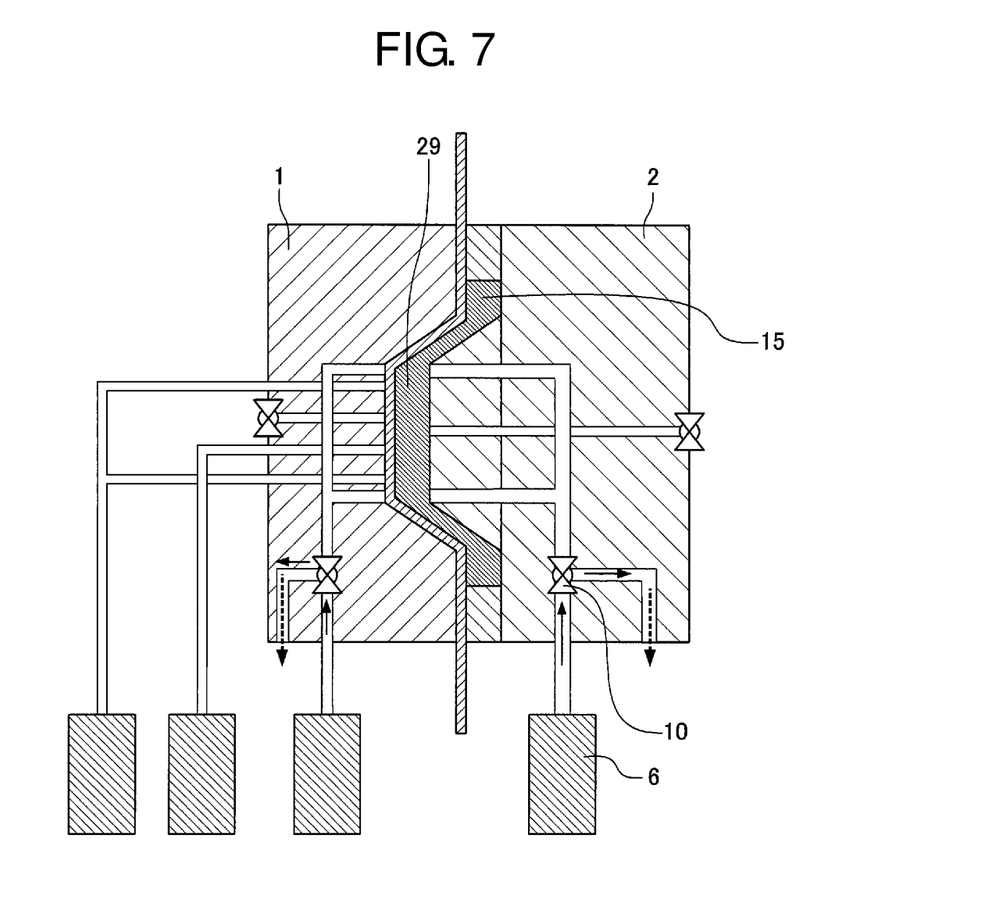
FIG. 7 is a sectional view illustrating the operational order of the decoration molding machine in the decoration molding method of the invention.

Next, in FIG. 7, first, switching valve 10 performs switching, and thereby the warm air flowing out from second die 2 is discharged as is without being blown from the molding surface of second die 2. Since warm-air heater 6 does not need to stop air supply, and it is possible to hereby prolong a service life of warm-air heater 6. Immediately after blowing of the warm air is stopped from second die 2, molten resin 29 is injected by a predetermined amount. Further, a molding process including such as pressure keeping, and cooling is performed, and molded product 15, to which the pattern of film 3 is transferred, is molded. The tensile force of film 3 is restored after resin 29 is injected. In this manner, film 3 is heated with the warm air blown until immediately before resin 29 is injected, and film 3 is also adsorbed and fitted along first die 1. In this manner, the injection molding can be performed before the temperature of film 3 decreases.

Figure 8:
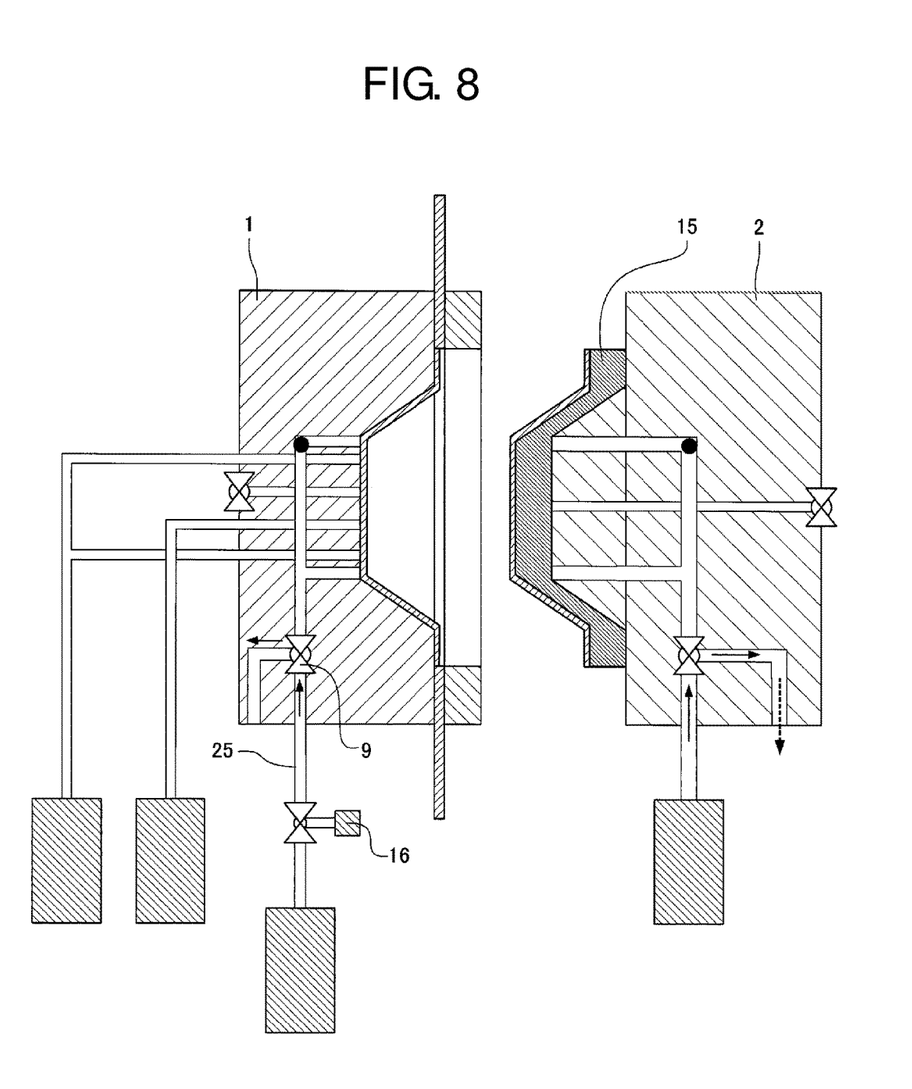
FIG. 8 is a sectional view illustrating the operational order of the decoration molding machine in the decoration molding method of the invention.

Finally, in FIG. 8, switching valve 9 on first die 1 side performs the switching, regulating valve 16 is adjusted such that air blowing is started from first die 1 side through warm-air blowing circuit 25, and first die 1 and second die 2 are opened. Molded product 15 is detached from first die 1.

Figure 9:
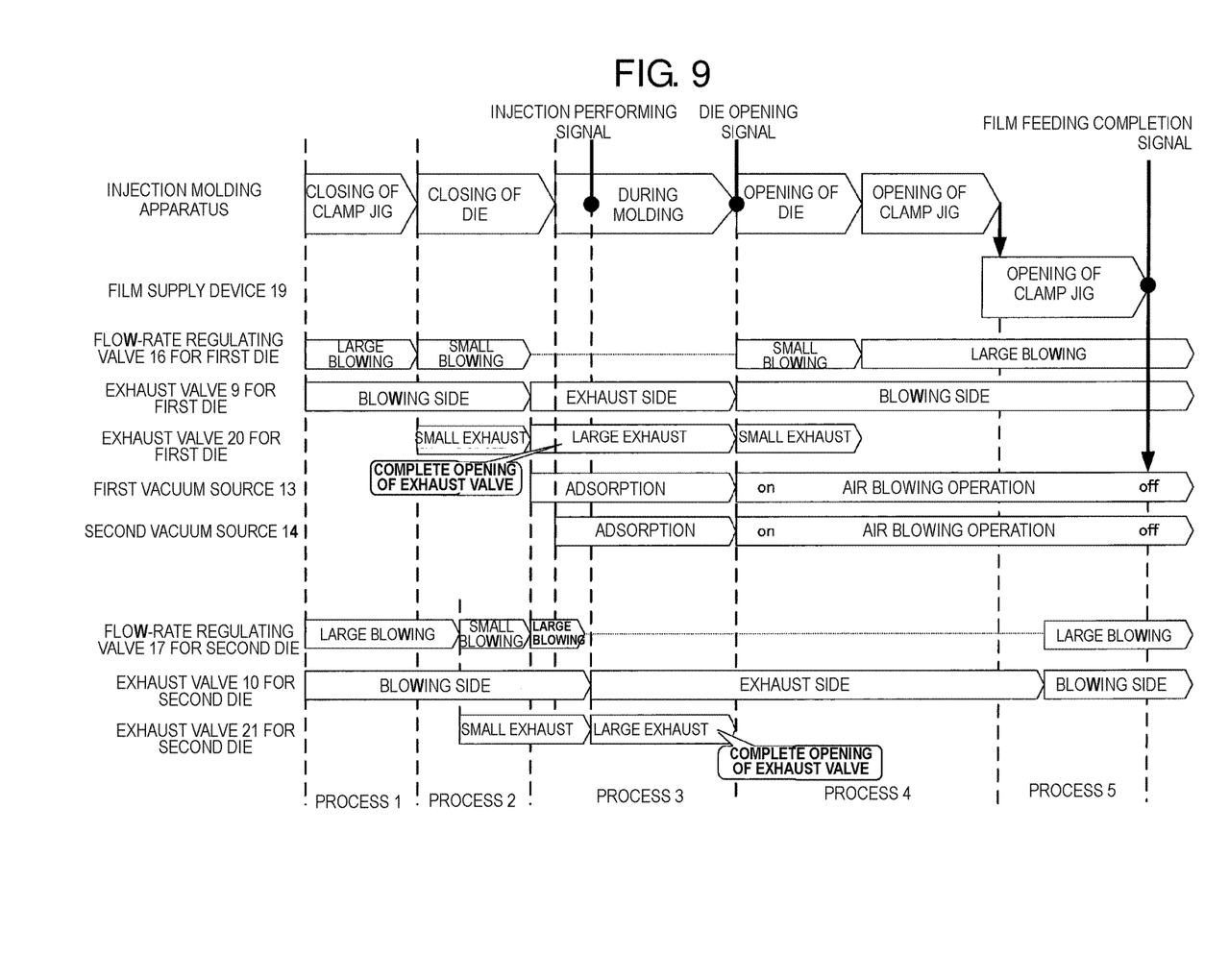
FIG. 9 is a diagram depicting the operation of the decoration molding machine in the decoration molding method of the invention.

FIG. 9 is a diagram depicting an operation of the decoration molding machine in the decoration molding method of the invention, as a sequence diagram depicting details of a process from the time when the film is supplied after the opening of the dies to the time when a new film is supplied after the taking-out of the molded product, in Example of the operation during the same molding as in FIG. 2 to FIG. 8. Particularly, a relationship between flow-rate regulating valve 16 for the first die, exhaust valve 20 for first die, switching valve 9 for first die, flow-rate regulating valve 17 for the second die, exhaust valve 21 for second die, switching valve 10 for second die, vacuum source 13, and vacuum source 14 is described.

When new film 3 is supplied, first, flow-rate regulating valve 16 for the first die and flow-rate regulating valve 17 for the second die are fully opened and the blowing is performed at the maximum flow rate. The warm air may be mainly blown to a position at which film 3 needs to extend (Process 1)

Next, when clamp jig 4 is closed, flow-rate regulating valve 16 for the first die is narrowed, and the flow rate of the warm air is reduced. Meanwhile, exhaust valve 20 for the first die is opened. In a case where an opening/closing angle of exhaust valve 20 for the first die can be adjusted, the valve is not made fully opened, and then an exhaust amount is regulated by adjusting the opening/closing angle of the valve in a range in which blowing pressure is not increased. In a case where the valve is fully opened and the exhaust amount is excessively increased, exhaust valve 20 is closed and a sufficient amount may be obtained by leakage from a gap between parts of the mold. Meanwhile, for second die 2, when clamp jig 4 is closed, flow-rate regulating valve 17 for the second die is fully opened as is.

Next, first die 1 and second die 2 are closed. At this time, flow-rate regulating valve 17 for the second die is fully opened until the dies are closed; however, flow-rate regulating valve 17 for the second the is narrowed, and then the flow rate is reduced, immediately before the dies are closed. At this time, exhaust valve 21 for the second the is also opened. In a case where an opening/closing angle of exhaust valve 21 for the second die can be adjusted, the valve is not made fully opened, and then an exhaust amount is regulated by adjusting the opening/closing angle of the valve in a range in which blowing pressure is not increased. In a case where the valve is fully opened and the exhaust amount is excessively increased, exhaust valve 21 is closed and a sufficient amount may be obtained by leakage from a gap between parts of the mold. Further, when the dies are completely closed, flow-rate regulating valve 16 for the first die and flow-rate regulating valve 17 for the second die are opened or closed little by little, and thereby film 3 vibrates. In this manner, it is possible to suppress decrease of the temperature of the film due to the close contact of film 3 with the mold, and it is possible to increase the temperature of film 3. At this time, a relationship between the temperatures of the respective members is the temperature of the mold <the temperature of the film <the temperature of the warm air blowing (Process 2)

Next, first vacuum source 13 turns ON. The flow rate of flow-rate regulating valve 17 for the second die is increased and film 3 is heated. Then, second vacuum source 14 turns ON and film 3 is absorbed and fixed to first die 1. These operations are performed by control of the control device (not illustrated) and are controlled depending on a state of the closing of the dies or the temperature in the cavity.

An adsorption method at this time is described with reference to FIG. 1 and FIG. 10.

Figure 10:
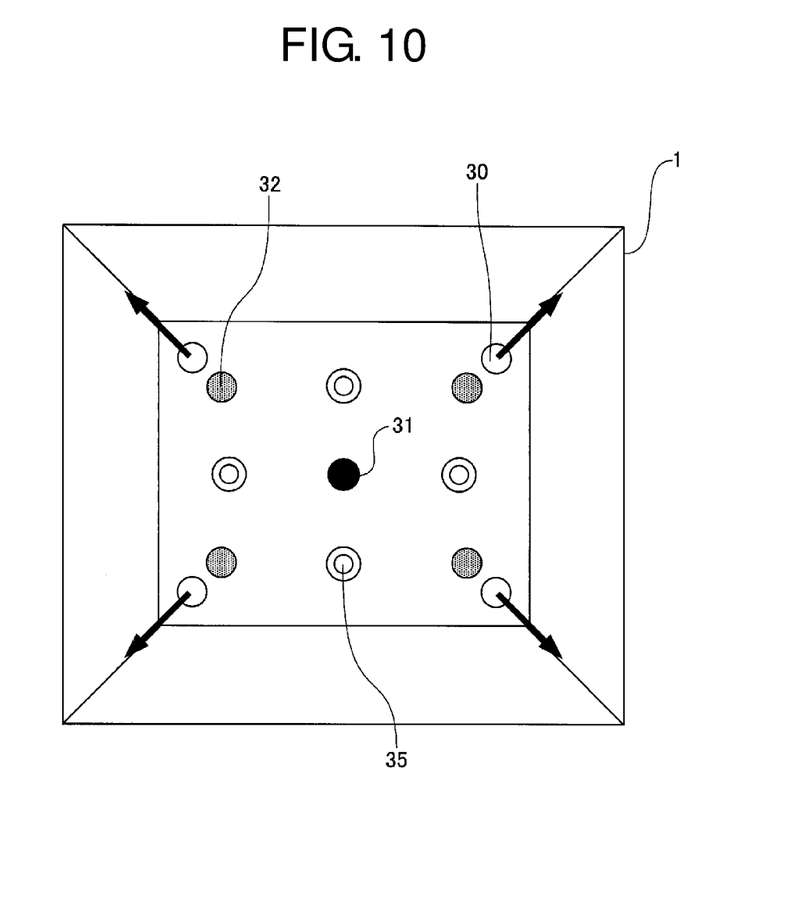
FIG. 10 is a diagram illustrating an internal surface of a cavity of a first die in the decoration molding machine according to the invention.

FIG. 10 is a diagram illustrating an internal surface of a cavity of the first die in the decoration molding machine according to the invention, as a diagram illustrating a surface of the mold to which film 3 of first die 1 is adsorbed and fixed. Warm air blowing port 30 is disposed on an end portion of warm air blowing circuit 25 such that the warm air blown to a position, at which film 3 needs to extend the most, blows therein. In the drawings, especially, the warm-air blowing port is disposed so as for the warm air to reach a corner at which the film extends the most and is unlikely to be brought into closest contact with the mold. In addition, adsorption port 31 in the drawings is connected to first vacuum source 13 through adsorption circuit 23. Adsorption port 32 in the drawings is connected to second vacuum source 14 through adsorption circuit 24. As illustrated in FIG. 3, first vacuum source 13 is, first, vacuumed such that the center of the film is adsorbed and fixed to the surface of the mold, and then second vacuum source 14 is vacuumed such that locally heated film 3 is extended and it is possible for the film to be absorbed and fixed to the surface of the mold toward the corners. In other words, a portion in which film 3 is bent is a position at which film 3 needs to extend the most. In the portion, adsorption port 32 performs adsorption of film 3. The other portion thereof, for example, is the center portion of the surface of the cavity, and film 3 is adsorbed from adsorption port 31. After the adsorption from adsorption port 31 is started, the adsorption from adsorption port 32, at which film 3 needs to extend, is performed. Reference number 35 represents an atmosphere-opened port which leads to exhaust valve 20.

Back to FIG. 9, operations after the adsorption of the film are described.

First, after film 3 is adsorbed, and fixed to first die 1, switching valve 10 for the second die performs switching to the exhaust side, and thereby the warm air is discharged out from the mold (=the die). Then, the molten resin is injected, and pressure keeping and cooling are performed, and molding is completed. Then, the mold is opened (Process 3).

Next, the mold is opened, and at the same time flow-rate regulating valve 16 for the first die is narrowed, and the flow rate of the warm air is reduced. Then, switching valve 9 for the first die performs switching to the blowing side, and the warm air is blown in the cavity of first die 1. When the mold is opened, film 3 remaining on first die 1 is hereby peeled off from first die 1 by warm air, and it is possible to detach film 3 without breakage. After the dies are completely opened, clamp jig 4 is opened, and at the same time flow-rate regulating valve 16 for the first die is fully opened, and the flow rate of the warm air is increased. and thereby it is possible to prevent dust (including a piece of foil) or ink scum from entering the inside of the mold (Process 4).

Next, after molded product 15 (refer to FIG. 8) is taken out, switching valve 10 for the second die performs switching to the blowing side, flow-rate regulating valve 17 for the second die is fully opened, and the warm air reaches film 3 (Process 5). Then, film supply device 19 is operated, thereby film 3 to which a new pattern adheres is supplied in the mold, and the process proceeds to the next molding cycle.

As above, characteristics of the method are as follow. The warm air circuit is disposed such that the film can be heated from both sides of the projection side and the recess side of the dies, and the warm air reaches the film from the supply time of the film, and then the film is heated. Then, the warm air continuously blows in a space in which the resin is injected even after the dies are closed, and thereby the film is continuously heated. Then, the warm air from the die on the projection side reaches the positions at which the film needs to extend such that the film is fitted to the shape of the die on the concave side, the film is adsorbed and fixed to the die on the recess side, and thereby the film is shaped after the recess die. After film 3, on which decoration is performed, is supplied in the dies and the dies are closed, film 3 is heated until the resin is injected, and thereby film 3 is likely to extend so as for film 3 to be shaped after the mold shape. Film 3 is unlikely to be torn during the molding, and it is possible to prevent a broken piece of the film or a broken piece of the decoration film from being mixed and being stuck to the surface of the die, and it is possible to improve quality of the external appearance of the molded product.

The invention is applicable to an in-mold decoration molding method, an in-mold decoration molding machine, and the like. In those, it is possible to improve quality of the external appearance of a molded product. In those, a pattern is printed on a film, and the pattern on the film is transferred at the same time when injection molding is performed.

What is claimed is:

1. An in-mold decoration molding method of performing resin molding in a state of disposing a film having a decoration layer on a surface thereof in a cavity of a molding die including a plurality of dies having at least a first die and a second die, and then transferring the decoration layer to a resin molded product, the in-mold decoration molding method comprising:

disposing the film between the first die and the second die;

blowing warm air to the film from a first die side and a second die side;

pressing the film against the first die by a clamp jig;

circulating the warm air, by exhausting the warm air through an exhaust port provided at a surface of the first die in the cavity while blowing the warm air from the first die side, in a state where the film is pressed against the first die by the clamp jig;

fastening the dies in a state where the warm air is blown from the first die side and from the second die side;

stopping the blowing of the warm air from the first die side with the dies fastened;

injecting a resin in the cavity; and adsorbing the film to an internal surface of the cavity of the first die after the fastening of the dies until the injecting of the resin, wherein the film is heated with the warm air blown from the first die and the second die, wherein the adsorbing of the film further includes adsorbing the film and fixing the film from a center adsorption port which is disposed at a center portion of the surface of the cavity, and after the adsorbing the film from the center adsorption port is started, adsorbing the film and fixing the film to the surface of the cavity toward a corner adsorption port which is disposed at a corner of the surface of the cavity, wherein, in the fastening of the dies, when the dies have reached a minimum distance from one another, the first die and the film enter into a non-contact state by the blowing of warm air from the first die side to the film, and the second die and the film enter into a non-contact state by the blowing of warm air from the second die side to the film.

2. The in-mold decoration molding method of claim 1, wherein, in the adsorbing, a center portion of the film is adsorbed to a surface of the cavity of the first die, and then a portion other than the center portion of the film is adsorbed toward the corner of the surface of the cavity of the first die.

3. The in-mold decoration molding method of claim 1, wherein warm air blown from the first die and the second die is blown to the center portion of the film.

4. The in-mold decoration molding method of claim 1, wherein an amount of warm air blown from the first die and the second die is controlled based on an operation of the molding die, a position of the film, and a temperature of the film.

5. The in-mold decoration molding method of claim 1, wherein the blowing of warm air from the second die is stopped after the stopping until the injecting of the resin.

* * * * *